May 26, 1970           D. ALLPORT           3,514,366
MOLDED ARTICLE HAVING DIFFERENT PORTIONS PRESENTING
DIFFERENT SURFACE APPEARANCES
Filed April 11, 1966           2 Sheets-Sheet 1
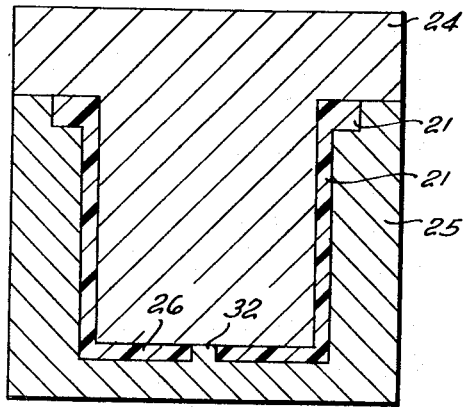
FIG.1
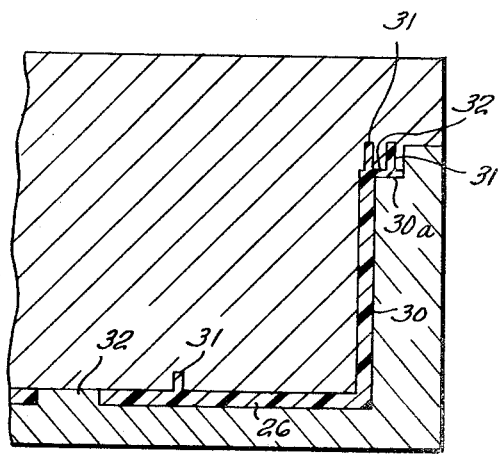
FIG.2
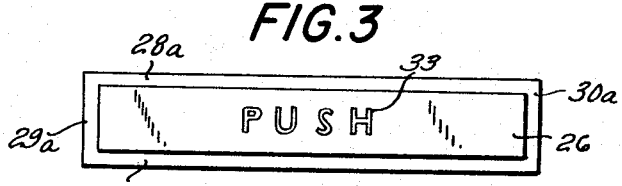
FIG.3
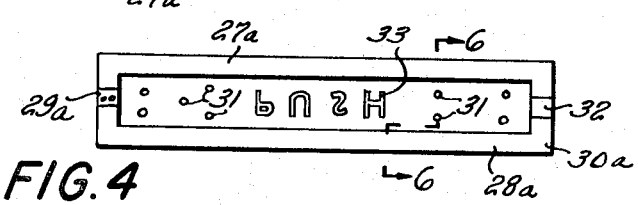
FIG.4
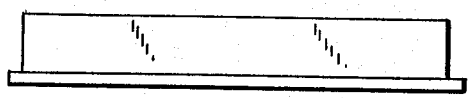
FIG.5
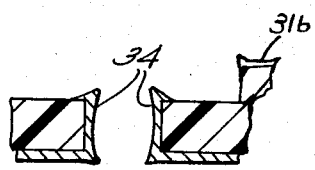
FIG. 7A
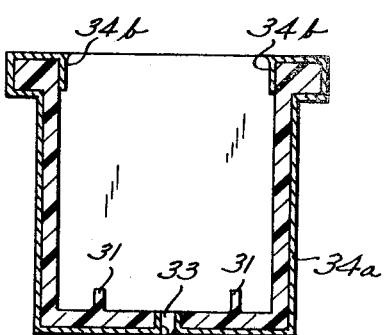
FIG.6
FIG.7
INVENTOR.
DAVIES ALLPORT
BY
Kane, Dalsimer, Kane & Smith
ATTORNEYS

INVENTOR.
DAVIES ALLPORT
BY
ATTORNEYS

United States Patent Office 3,514,366
Patented May 26, 1970

3,514,366
MOLDED ARTICLE HAVING DIFFERENT POR-
TIONS PRESENTING DIFFERENT SURFACE
APPEARANCES
Davies Allport, Denton, Tex., assignor to Amerace Cor-
poration, New York, N.Y., a corporation of Delaware
Filed Apr. 11, 1966, Ser. No. 541,777
Int. Cl. B29c 9/00; B29f 1/10; B32b 31/12
U.S. Cl. 161—120                                    7 Claims

ABSTRACT OF THE DISCLOSURE

An integrally molded plastic article having different component portions presenting different surface appearances is produced which comprises: (a) a first component of plastic material having a predetermined melting temperature and having a first portion with a surface contour forming at least a portion of the exposed surface of the article and a second portion which is not exposed on the surface of the article; (b) a coating of a material having a melting point substantially higher than the melting point of the plastic material from which the first component is made covering the surface of at least a part of the second portion of the first component; and (c) a second component of a plastic material having a melting temperature substantially lower than the melting temperature of the coating and having an exposed surface portion and a second portion in intimate engagement with the coating, said coating in part being on the exterior surface of the finished article and exposed to view.

---

Many articles of manufacture previously made from metal are now molded from plastic materials. Thus handles, knobs, brackets, fixtures, and decorative articles are commonly molded from plastic material. In many instances, it is desirable to provide the molded plastic article with different surface portions presenting different surface appearances thereby imparting a decorative appearance thereto or sometimes serving a functional purpose or both decorative and functional. Thus, various indicia, markings and instructions may be shown in contrasting colors, textures and/or finishes. Similarly, decorative designs may be shown in contrasting colors, textures and/or finishes. Portions of the articles frequently may have one or more metallic coatings, such as chrome applied thereto for similar purposes.

The methods heretofore employed for forming such molded plastic articles with portions having different surface appearances or functional requirements were not always satisfactory. Thus, where various types of coatings, such as metallic coatings, were applied in patterns to certain portions only of molded articles, difficulty was frequently encountered in obtaining proper registration and costs often are prohibitive and many of the applied color coatings were easily scratched from the surfaces. Also where a portion of an article was first molded of a plastic material of one color and another portion of the article was molded with surfaces in adjacency therewith from a plastic material of contrasting color or material, satisfactory adhesion between the two portions and clear definition of surfaces was not always obtained. Also, at times the heat from the molding of the second plastic portion adversely affected zones of the first portion by softening surface areas and damaging or distorting small projecting portions such as knurling, tongues, grooves and other interlocking parts which require clear definition in the attainment of a satisfactory product.

A problem results when a plastic part is to be coated with a bright metallic surface and is so designed that mechanical or functional components such as thick sections, bosses or ribs are required. Often the surface of the platic part is required to be blemish free and void of sink marks, flow lines and other imperfections that often are caused by the mechanical or functional bosses or ribs. Therefore, many part designs have not been satisfactory when molded as a one piece part and metal coated.

It is a prime object of the present invention to overcome the difficulties and disadvantages heretofore encountered and to provide an improved molded article having different portions presenting clearly defined different surface appearances and to provide an improved molded article that has inmproved surface conditions that are not effected by change in section requirements and an improved method of making the same whereby the article can be manufactured in a manner which enables the production of a wide variety of articles with an infinite variety of different portions presenting different surface appearances or functions or both. By means of my method a wide variety of markings and decorative and functional designs may be effectively provided.

In carrying out my invention I mold a first component of the article from a thremoplastic or thermoset plastic material having a predetermined melting temperature and having a first portion with a surface contour corresponding to the desired surface contour of a portion of the finished article and with a second portion which is not exposed on the surface of the finished article. Thereafter I apply over the surface of at least a part of the second portion of the first component a coating of a material such as metal having a melting point substantially higher than the melting point of the material from which the first component is made and thereafter I mold a second component from a plastic material having a melting temperature substantially lower than the melting temperature of the coating, having a surface portion which may be exposed in the finished article and a second portion in intimate engagement with the coating providing a molding surface for said second portion of said second component.

The coating serves as a molding surface for the second portion of the second component while maintaining the clear definition of the surface portion of the second component. Although in certain applications some adhesion is achieved, it has been found that for best results the components produced in the various operations must be specifically designed for mechanical interlocking between each and with the coating material as will appear below.

In the accompanying drawings:

FIG. 1 is a transverse sectional view of a first component of the finished article between upper and lower halves of a first mold;

FIG. 2 is a longitudinal fragmentary section taken along the line 2—2 in the direction of the arrows in FIG. 1;

FIG. 3 is a top plan view of the first component after removal from the first mold;

FIG. 4 is a bottom plan view of the component shown in FIG. 3;

FIG. 5 is a side elevation of the component shown in FIG. 3;

FIG. 6 is a transverse sectional view taken along the the line 6—6 in the direction of the arrows as shown in FIG. 4;

FIG. 7 is a sectional view similar to the view in FIG. 6 showing the first component after application of a coating;

FIG. 7A is an enlarged view of a segment of the first component shown in FIG. 7;

Figure 8:
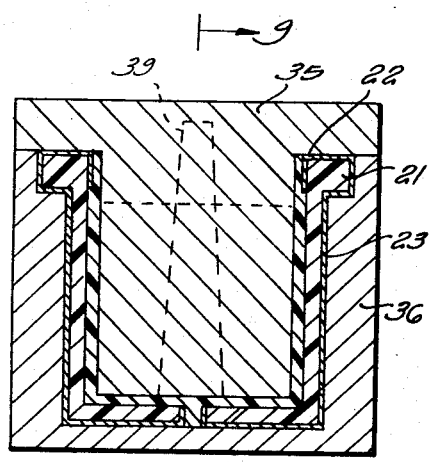
FIG. 8 is a transverse sectional view of the first component with coating and a surrounding second component between upper and lower halves of a second mold.
Figure 9:
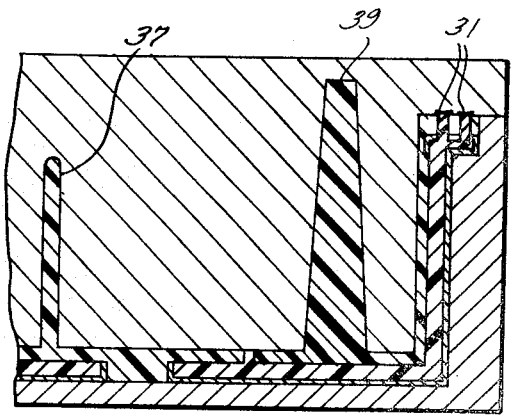
FIG. 9 is a longitudinal fragmentary section taken along the line 9—9 in the direction of the arrows as shown in FIG. 8.
Figure 10:
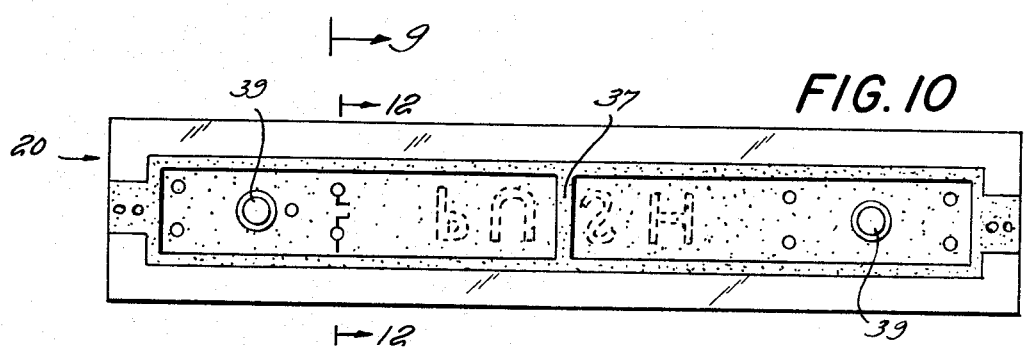
FIG. 10 is a bottom plan view of the finished article after removal from the second mold.
Figure 11:
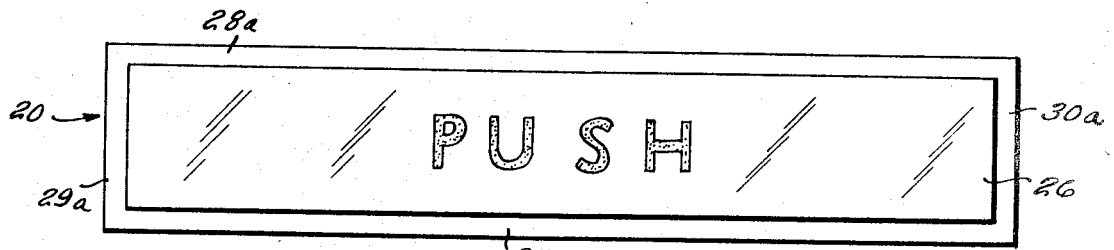
FIG. 11 is a top plan view of the article shown in FIG. 10.
Figure 12:
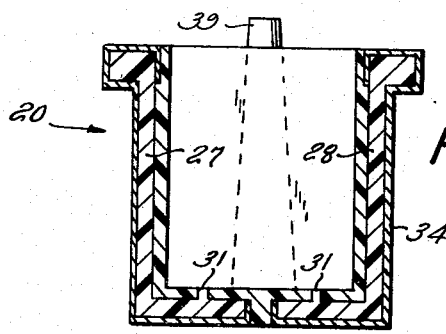
FIG. 12 is a sectional view taken along the line 12—12 in the direction of the arrows as shown in FIG. 10.

In the figures there is illustrated in various stages of completion a composite elongated push panel device 20 produced in accordance with the teaching of this invention. The push panel device comprises first and second components 21 and 22 respectively, formed from a plastic material and a coating material such as metal 23. Push device 20 is illustrative of the type of composite member which can be produced utilizing the teachings of this invention and it should be understood that an infinite variety of configurations and arrangements can be achieved by practice of the method disclosed herein.

In FIGS. 1 and 2 first component 21 is shown having been formed within the mold cavity provided by first mold upper and lower sections 24 and 25 respectively. The first component removed from the mold being shown in FIGS. 3 through 6 is formed of a plastic material having a predetermined melting or setting temperature range such as a high impact type polystyrene complex. Acrylonitrile butadiene styrene terpolymers and blends has been found particularly suitable for this purpose, however other basic resins and materials can be used if found suitable for a specific application.

Component 21 is elongated with rectangular base 26, upstanding sides 27 and 28 and ends 29 and 30 perpendicular thereto with respective outwardly directed flanges 27a, 28a, 29a and 30a extending from the edges thereof. First mold sections 24 and 25 are so formed as to provide a plurality of projections 31 extending upwardly from surface 26a of base 26 and in other areas as required to provide a mechanical interlock with the second component 22 when the second component is molded as will be explained below. Additionally, sprue channel 32 provided in flange 30a can also serve the purpose of providing an interlock as will appear below. Of course other specific forms of mechanical interlocking can be utilized. Openings 33 are provided in base 26 forming a plurality of letters or other indicia which in the example shown spell the word "PUSH."

The outer surface of component 21 provides a first portion of the component having a surface contour corresponding to the desired surface contour of a portion of the finished article. The surface of the first component which will not be exposed on the surface of the finished article is referred to herein as the second portion of the first component.

After component 21 has been removed from mold halves 24 and 25 I apply over the surface of at least a part of the second portion of the first component a coating 34 of a material such as metal which has a melting point substantially higher than the melting point of the plastic material from which the first component has been made.

The coating 34 can be applied to all of the first component 21, to all of the second portion only, or to part of the second portion only or to part of the first portion only. The metal coating aids in the next or second molding operation since it dissipates heat and thus protects the delicate marginal edges of the first component, may serve as a molding surface and may provide improved engagement of surfaces.

The method of application of coating 34 is optional and any suitable known method of metal coating a plastic material, such as electrolytic deposition, vapor deposition, electrolysis deposition, acid etching, dipping, flaming or corona discharge can be utilized. The preferred method however is the well-known electrolytic or standard plating process.

The numeral 34a indicates the first portion of the first component coated with metal which corresponds to the desired surface contour of a portion of the finished article. And I may apply, although it is not shown in the drawings, the coating over the inner surface of component 21. The numeral 34b indicates the second portion of the first component which is coated with metal and which does not provide a surface which is exposed in the finished article. Coating portions 34, 34a and 34b collectively provide coating 23 referred to heretofore.

After coating I place coated component 21 in second mold halves 35 and 36 and in the cavity remaining I mold from a plastic material having a melting temperature substantially lower than the melting temperature of the coating 23 a second component 22 having a surface portion which may be exposed in the finished article and a second portion in intimate engagement with the coating 34. The coating 34 may serve as a molding surface for the second component 22 within openings 33 and at 34b which are part of the second portion of the first component as referred to herein, thus clearly defining the edges of the component 22 at these zones.

In view of the utilization of coating 34 smaller openings 33 providing intelligible indicia can be used in view of the higher melting point of the metallic coating maintaining the first component and the second component in distinct separate zones. The metallic coating also strengthens the first component and in addition dissipates heat during the molding operation in which the second component is formed thereby allowing for fast molding operation.

The heat during molding of the material providing the second component may be in the order of that of the first component or it may be of a higher or lower order. In the case of thermoplastic material this is in the order of the melting point of the material. The melting point of the metal coating is higher and therefore the metal provides a good molding surface for the second component, particularly at edges and fine or delicate portions as well as dissipating heat.

In addition, the material from which the second component is formed can differ from the material from which the first component is formed.

During the second molding operation during which the second component is formed the plastic material encircles projections 31 and fills channel 32 providing mechanical interlocks preventing separation of the two components. This is a technique known in the art and any mechanical means of holding the two molded parts together whether through interlocks, V-notches, holes, recesses, undercuts, channels, etc. may be used when found suitable for the particular configurations of the components providing the finished article. Additionally, a strengthening rib, such as rib 37 and mounting pins 39 may be formed without any adverse effects to the original molded part.

This method provides many advantages with the metallic portion acting as a heat sink, conducting heat in a manner more rapid than is accomplished by the plastic and providing greater mechanical strength during molding, thus enabling faster operation during the second plastic molding step. Also when projections such as projection 31 in the figures are plated an improved mechanical interlock of the parts results due to build-up of metallic material on the head of the projection as shown as 31b. This effect may also be used on other edges such as around the edge of openings as is shown as 34 (see FIG. 7A), obtaining further mechanical interlock since there is a plating build-up around the edges of the opening which aids in the mechanical interlocking.

Thus, I have provided a method of forming a molded article having different component portions presenting different surface appearances and functional areas by successive molding operations and have achieved, among others, the several objects of the invention as specifically aforenoted. Obviously, numerous changes in construction and rearrangement of parts might be resorted to without departing from the spirit of the invention as defined by the claims.

I claim:

1. A molded article having different component portions presenting different surface appearances which comprises:
   (a) a first component formed of a plastic material having a predetermined melting temperature and having a first portion with a surface contour forming the surface contour of at least a portion of the article and also having a second portion which is not exposed on the surface of the article;
   (b) a coating of a material having a melting point substantially higher than the melting point of the plastic material from which the first component is made covering the surface of at least a part of the second portion of the first component;
   (c) and a second component formed of a plastic material having a melting temperature substantially lower than the melting temperature of the coating and having an exposed surface portion and a second portion in intimate engagement with the said coating, said coating serving in part as a molding surface for said second portion of said second component and in part being on the exterior surface of the finished article and exposed to view.

2. A molded article having different component portions presenting different surface appearances as set forth in claim 1 in which first and second mechanical interlock means are provided on said first and second components respectively in cooperative engagement to maintain said first and second components free of relative motion.

3. A molded article having different component portions presenting different surface appearances as set forth in claim 2 in which said coating is a thin layer of metal.

4. A molded article having different component portions presenting different surface appearances as set forth in claim 3 in which said metallic coating is applied over the first and second portions of the first component.

5. A molded article having different component portions presenting different surface appearances as set forth in claim 3 in which said second component has a surface portion exposed and said exposed surface of said second component and the second portion of the first component present different surface appearances.

6. A molded article having different component portions presenting different surface appearances as set forth in claim 2 in which said metallic coating covers a portion of said first mechanical interlock means cooperataing therewith and with said second mechanical interlock means.

7. A molded article having different component portions presenting different surface appearances which comprises:
   (a) a first component formed of a plastic material having a predetermined melting temperature and having a first portion with a surface contour forming the surface contour of at least a portion of the article and also having a surface portion which is not exposed on the surface of the article and having a plurality of projections or recesses providing first interlock means;
   (b) a coating of a material having a melting point substantially higher than the melting point of the material from which the first component is made covering the surface of at least a part of the second portion of the first component;
   (c) and a second component formed of a plastic material having a melting temperature substantially lower than the melting temperature of the coating and having an exposed surface portion and a second portion in intimate engagement wtih the said coating, said coating serving in part as a molding surface for said second portion of said second component and in part being on the exterior surface of the finished article and exposed to view, and a plurality of third portions respectively surrounding or within said first interlock means and cooperating therewith to maintain said first and second components free of relative movement.

References Cited
UNITED STATES PATENTS

| | | | |
|---|---|---|---|
| 2,656,803 | 8/1951 | Danielson et al. | 264—247 X |
| 3,041,131 | 6/1962 | Juras et al. | 264—255 X |
| 3,086,250 | 4/1963 | Gits | 264—334 X |
| 3,246,066 | 4/1966 | Gits | 161—138 X |
| 2,652,651 | 9/1953 | La Barbera | 264—135 X |

ROBERT F. BURNETT, Primary Examiner

R. O. LINKER, Jr., Assistant Examiner

U.S. Cl. X.R.

40—135; 161—138; 264—135, 246, 274

UNITED STATES PATENT OFFICE

CERTIFICATE OF CORRECTION

Patent No. 3,514,366                                           May 26, 1970

Davies Allport

It is certified that error appears in the above identified patent and that said Letters Patent are hereby corrected as shown below:

Column 2, line 1, "platic" should read -- plastic --; line 12, "inmproved" should read -- improved --. Column 6, line 26, "wtih" should read -- with --; line 39, "2,656,803" should read -- 2,565,803 --.

Signed and sealed this 5th day of January 1971.

(SEAL)
Attest:

Edward M. Fletcher, Jr.                              WILLIAM E. SCHUYLER, JR.
Attesting Officer                                              Commissioner of Patents